US008983216B2

(12) United States Patent
Izhikevich et al.

(10) Patent No.: US 8,983,216 B2
(45) Date of Patent: *Mar. 17, 2015

(54) INVARIANT PULSE LATENCY CODING SYSTEMS AND METHODS

(71) Applicant: Brain Corporation, San Diego, CA (US)

(72) Inventors: Eugene M. Izhikevich, San Diego, CA (US); Botond Szatmary, San Diego, CA (US); Csaba Petre, San Diego, CA (US)

(73) Assignee: Brain Corporation, San Diego, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 13/895,246

(22) Filed: May 15, 2013

(65) Prior Publication Data

US 2013/0251278 A1   Sep. 26, 2013

Related U.S. Application Data

(63) Continuation of application No. 12/869,583, filed on Aug. 26, 2010, now Pat. No. 8,467,623.

(60) Provisional application No. 61/318,191, filed on Mar. 26, 2010.

(51) Int. Cl.
*H04N 19/107* (2014.01)
*G06T 7/20* (2006.01)
(Continued)

(52) U.S. Cl.
CPC ............... *H04N 19/107* (2014.11); *G06T 7/20* (2013.01); *G06T 7/40* (2013.01); *H04B 14/026* (2013.01);
(Continued)

(58) Field of Classification Search
None
See application file for complete search history.

(56) References Cited

U.S. PATENT DOCUMENTS

| 5,063,603 A | 11/1991 | Burt |
| 5,138,447 A | 8/1992 | Shen |

(Continued)

FOREIGN PATENT DOCUMENTS

| CN | 102226740 A | 10/2011 |
| JP | 4087423 | 3/1992 |

(Continued)

OTHER PUBLICATIONS

Cessac et al. "Overview of facts and issues about neural coding by spikes." Journal of Physiology, Paris 104.1 (2010): 5.

(Continued)

*Primary Examiner* — Randolph I Chu
*Assistant Examiner* — Nathan Bloom
(74) *Attorney, Agent, or Firm* — Pillsbury Winthrop Shaw Pittman LLP

(57) ABSTRACT

Systems and methods for processing image signals are described. One method comprises obtaining a generator signal based on an image signal and determining relative latencies associated with two or more pulses in a pulsed signal using a function of the generator signal that can comprise a logarithmic function. The function of the generator signal can be the absolute value of its argument. Information can be encoded in the pattern of relative latencies. Latencies can be determined using a scaling parameter that is calculated from a history of the image signal. The pulsed signal is typically received from a plurality of channels and the scaling parameter corresponds to at least one of the channels. The scaling parameter may be adaptively calculated such that the latency of the next pulse falls within one or more of a desired interval and an optimal interval.

20 Claims, 1 Drawing Sheet

(51) Int. Cl.
*G06T 7/40* (2006.01)
*H04B 14/02* (2006.01)
*G06T 9/00* (2006.01)
*G06K 9/46* (2006.01)
*H04N 19/00* (2014.01)

(52) U.S. Cl.
CPC ....... *G06T 9/002* (2013.01); *G06T 2207/10016* (2013.01); *G06K 9/46* (2013.01); *H04N 19/00* (2013.01)
USPC .......................................................... 382/236

(56) References Cited

U.S. PATENT DOCUMENTS

| | | | |
|---|---|---|---|
| 5,216,752 A | 6/1993 | Tam | |
| 5,272,535 A | 12/1993 | Elabd | |
| 5,355,435 A | 10/1994 | DeYong | |
| 5,638,359 A | 6/1997 | Peltola | |
| 5,673,367 A | 9/1997 | Buckley | |
| 5,875,108 A | 2/1999 | Hoffberg | |
| 6,009,418 A | 12/1999 | Cooper | |
| 6,014,653 A | 1/2000 | Thaler | |
| 6,035,389 A | 3/2000 | Grochowski | |
| 6,418,424 B1 | 7/2002 | Hoffberg | |
| 6,458,157 B1 | 10/2002 | Suaning | |
| 6,509,854 B1 | 1/2003 | Morita | |
| 6,545,705 B1 | 4/2003 | Sigel | |
| 6,545,708 B1 | 4/2003 | Tamayama | |
| 6,546,291 B2 | 4/2003 | Merfeld | |
| 6,581,046 B1 | 6/2003 | Ahissar | |
| 6,625,317 B1 | 9/2003 | Gaffin | |
| 7,580,907 B1 | 8/2009 | Rhodes | |
| 7,653,255 B2 | 1/2010 | Rastogi | |
| 7,737,933 B2 | 6/2010 | Yamano | |
| 7,849,030 B2 | 12/2010 | Ellingsworth | |
| 8,000,967 B2 | 8/2011 | Taleb | |
| 8,015,130 B2 | 9/2011 | Matsugu | |
| 8,103,602 B2 | 1/2012 | Izhikevich | |
| 8,160,354 B2 | 4/2012 | Paquier | |
| 8,200,593 B2 | 6/2012 | Guillen | |
| 8,311,965 B2 | 11/2012 | Breitwisch | |
| 8,315,305 B2 | 11/2012 | Petre | |
| 8,390,707 B2 | 3/2013 | Yamashita | |
| 8,416,847 B2 | 4/2013 | Roman | |
| 8,467,623 B2 | 6/2013 | Izhikevich | |
| 2002/0038294 A1 | 3/2002 | Matsugu | |
| 2003/0050903 A1 | 3/2003 | Li aw | |
| 2003/0216919 A1 | 11/2003 | Roushar | |
| 2004/0054964 A1* | 3/2004 | Bozdagi et al. ............ 715/500.1 |
| 2004/0136439 A1 | 7/2004 | Dewberry et al. | |
| 2004/0170330 A1 | 9/2004 | Fogg | |
| 2004/0193670 A1 | 9/2004 | Langan | |
| 2005/0015351 A1 | 1/2005 | Nugent | |
| 2005/0036649 A1 | 2/2005 | Yokono | |
| 2005/0096539 A1* | 5/2005 | Leibig et al. ................. 600/437 |
| 2005/0283450 A1 | 12/2005 | Matsugu | |
| 2006/0094001 A1 | 5/2006 | Torre et al. | |
| 2006/0129728 A1 | 6/2006 | Hampel | |
| 2006/0161218 A1 | 7/2006 | Danilov | |
| 2007/0022068 A1 | 1/2007 | Linsker | |
| 2007/0176643 A1 | 8/2007 | Nugent | |
| 2007/0208678 A1 | 9/2007 | Matsugu | |
| 2008/0100482 A1 | 5/2008 | Lazar | |
| 2008/0174700 A1* | 7/2008 | Takaba ........................ 348/678 |
| 2008/0199072 A1 | 8/2008 | Kondo | |
| 2008/0237446 A1 | 10/2008 | Oshikubo | |
| 2009/0043722 A1 | 2/2009 | Nugent | |
| 2009/0287624 A1 | 11/2009 | Rouat et al. | |
| 2010/0036457 A1 | 2/2010 | Sarpeshkar et al. | |
| 2010/0081958 A1 | 4/2010 | She | |
| 2010/0086171 A1 | 4/2010 | Lapstun | |
| 2010/0100482 A1 | 4/2010 | Hardt | |
| 2010/0166320 A1 | 7/2010 | Paquier | |
| 2010/0225824 A1 | 9/2010 | Lazar | |
| 2010/0235310 A1 | 9/2010 | Gage | |
| 2010/0299296 A1 | 11/2010 | Modha | |
| 2011/0016071 A1 | 1/2011 | Guillen | |
| 2011/0119214 A1 | 5/2011 | Breitwisch | |
| 2011/0119215 A1 | 5/2011 | Elmegreen | |
| 2011/0134242 A1* | 6/2011 | Loubser et al. ............... 348/143 |
| 2011/0137843 A1 | 6/2011 | Poon | |
| 2011/0160741 A1 | 6/2011 | Asano | |
| 2011/0206122 A1* | 8/2011 | Lu et al. .................... 375/240.13 |
| 2012/0011090 A1 | 1/2012 | Tang | |
| 2012/0083982 A1 | 4/2012 | Bonefas | |
| 2012/0084240 A1 | 4/2012 | Esser | |
| 2012/0109866 A1 | 5/2012 | Modha | |
| 2012/0303091 A1 | 11/2012 | Izhikevich | |
| 2012/0308076 A1 | 12/2012 | Piekniewski | |
| 2012/0308136 A1 | 12/2012 | Izhikevich | |
| 2013/0073484 A1 | 3/2013 | Izhikevich | |
| 2013/0073491 A1 | 3/2013 | Izhikevich | |
| 2013/0073492 A1 | 3/2013 | Izhikevich | |
| 2013/0073495 A1 | 3/2013 | Izhikevich | |
| 2013/0073496 A1 | 3/2013 | Szatmary | |
| 2013/0073498 A1 | 3/2013 | Izhikevich | |
| 2013/0073499 A1 | 3/2013 | Izhikevich | |
| 2013/0073500 A1 | 3/2013 | Szatmary | |
| 2013/0151450 A1 | 6/2013 | Ponulak | |
| 2013/0218821 A1 | 8/2013 | Szatmary | |
| 2013/0251278 A1 | 9/2013 | Izhikevich | |
| 2013/0297539 A1 | 11/2013 | Piekniewski | |
| 2013/0297541 A1 | 11/2013 | Piekniewski | |
| 2013/0297542 A1 | 11/2013 | Piekniewski | |
| 2013/0325766 A1 | 12/2013 | Petre | |
| 2013/0325768 A1 | 12/2013 | Sinyavskiy | |
| 2013/0325773 A1 | 12/2013 | Sinyavskiy | |
| 2013/0325774 A1 | 12/2013 | Sinyavskiy | |
| 2013/0325775 A1 | 12/2013 | Sinyavskiy | |
| 2013/0325777 A1 | 12/2013 | Petre | |
| 2014/0012788 A1 | 1/2014 | Piekniewski | |
| 2014/0016858 A1 | 1/2014 | Richert | |
| 2014/0032458 A1 | 1/2014 | Sinyavskiy | |
| 2014/0032459 A1 | 1/2014 | Sinyavskiy | |
| 2014/0052679 A1 | 2/2014 | Sinyavskiy | |
| 2014/0064609 A1 | 3/2014 | Petre | |
| 2014/0122397 A1 | 5/2014 | Richert | |
| 2014/0122398 A1 | 5/2014 | Richert | |
| 2014/0122399 A1 | 5/2014 | Szatmary | |
| 2014/0156574 A1 | 6/2014 | Piekniewski | |

FOREIGN PATENT DOCUMENTS

| | | | |
|---|---|---|---|
| RU | 2108612 C1 | 10/1998 | |
| RU | 2406105 C2 | 12/2010 | |
| RU | 2424561 C2 | 7/2011 | |
| WO | 2008083335 A2 | 7/2008 | |
| WO | 2008132066 A1 | 11/2008 | |

OTHER PUBLICATIONS

Dorval et al. "Probability distributions of the logarithm of inter-spike intervals yield accurate entropy estimates from small datasets." Journal of neuroscience methods 173.1 (2008): 129.

Gollisch et al. "Rapid neural coding in the retina with relative spike latencies." Science 319.5866 (2008): 11 08-1111.

Lazar et al. "A video time encoding machine", in Proceedings of the 15th IEEE International Conference on Image Processing (ICIP '08}, 2008, pp. 717-720.

Lazar et al. "Consistent recovery of sensory stimuli encoded with MIMO neural circuits." Computational intelligence and neuroscience (2010): 2.

Lazar et al. "Multichannel time encoding with integrate-and-fire neurons." Neurocomputing 65 (2005): 401-407.

Masquelier, Timothee. "Relative spike time coding and Stop-based orientation selectivity in the early visual system in natural continuous and saccadic vision: a computational model." Journal of computational neuroscience 32.3 (2012): 425-441.

Paugam-Moisy et al. "Computing with spiking neuron networks." Handbook of Natural Computing, 40 p. Springer, Heidelberg (2009).

Sato et al., "Pulse interval and width modulation for video transmission." Cable Television, IEEE Transactions on 4 (1978): 165-173.

(56) References Cited

OTHER PUBLICATIONS

Wang "The time dimension for scene analysis." Neural Networks, IEEE Transactions on 16.6 (2005): 1401-1426.
Florian03, Biologically inspired neural networks for the control of embodied agents, Technical Report Coneural-03-03 Version 1.0 [online], Nov. 30, 2003 [retrieved on Nov. 24, 2014]. Retrieved from the Internet: <URL:http://citeseerx.ist.psu.edu/viewdoc/download-?doi=10.1.1.216.4931&rep1&type=pdf>.
Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepages,cwi ,n11-sbolltedmblica6ond)hdthesislxif>.
Brette et al., Brian: A simple and flexible simulator for spiking neural networks, The Neuromorphic Engineer, Jul. 1, 2009, pp. 1-4, doi: 10.2417/1200906.1659.
Cuntz et al., 'One Rule to Grow Them All: A General Theory of Neuronal Branching and Its Paractical Application' PLOS Computational Biology, 6 (8), Published Aug. 5, 2010.
Davison et al., PyNN: a common interface for neuronal network simulators, Frontiers in Neuroinformatics, Jan. 2009, pp. 1-10, vol. 2, Article 11.
Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.
Fidjeland et al., Accelerated Simulation of Spiking Neural Networks Using GPUs [online],2010 [retrieved on Jun. 15, 2013], Retrieved from the Internet: URL:http://ieeexplore.ieee.org/xpls/abs_all.jsp?ammber=5596678&tag=1.
Floreano et al., 'Neuroevolution: from architectures to learning' Evol. Intel. Jan. 2008 1:47-62, [retrieved Dec. 30, 2013] [retrieved online from URL:<http://inforscience.epfl.ch/record/112676/files/FloreanoDuerrMattiussi2008.p df>.
Gewaltig et al., 'NEST (Neural Simulation Tool)', Scholarpedia, 2007, pp. 1-15, 2(4): 1430, doi: 1 0.4249/scholarpedia. 1430.
Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.
Goodman et al., Brian: a simulator for spiking neural networks in Python, Frontiers in Neuroinformatics, Nov. 2008, pp. 1-10, vol. 2, Article 5.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098.
Graham, Lyle J., The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.
Izhikevich, 'Polychronization: Computation with Spikes', Neural Computation, 25, 2006, 18, 245-282.
Izhikevich, 'Simple Model of Spiking Neurons', IEEE Transactions on Neural Networks, vol. 14, No. 6, Nov. 2003, pp. 1569-1572.
Izhikevich et al., 'Relating STDP to BCM', Neural Computation (2003) 15, 1511-1523.
Karbowski et al., 'Multispikes and Synchronization in a Large Neural Network with Temporal Delays', Neural Computation 12, 1573-1606 (2000).
Khotanzad, 'Classification of invariant image representations using a neural network' IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.
Laurent, 'The Neural Network Query Language (NNQL) Reference' [retrieved on Nov. 12, 2013]. Retrieved from the Internet: <URL'https://code.google.com/p/nnql/issues/detail?id=1>.
Laurent, 'Issue 1—nnql—Refactor Nucleus into its own file—Neural Network Query Language' [retrieved on Nov. 12, 2013]. Retrieved from the Internet: URL:https://code.google.com/p/nnql/issues/detail?id=1.
Nichols, A Re configurable Computing Architecture for Implementing Artificial Neural Networks on FPGA, Master's Thesis, The University of Guelph, 2003, pp. 1-235.
Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.
Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].
Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.egi/4620/ps/1774.pdf>.
Simulink.RTM. model [online], [Retrieved on Dec. 10, 2013] Retrieved from <URL: http://www.mathworks.com/ products/simulink/index.html>.
Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).
Sjostrom et al., 'Spike-Timing Dependent Plasticity' Scholarpedia, 5(2):1362 (2010), pp. 1-18.
Szatmary et al., 'Spike-timing Theory of Working Memory' PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371 %2Fjournal.pcbi.10008 79#>.
Gluck, Stimulus Generalization and Representation in Adaptive Network Models of Category Learning [online], 1991 [retrieved on Aug. 24, 2013]. Retrieved from the Internet:<URL:http://www.google.com/url?sa=t&rct=j&q=Giuck+%22STIMULUS+G ENERALIZATION+AND+REPRESENTATIO N+I N+ADAPTIVE+N ETWORK+MODELS+OF+CATEGORY+LEARN I NG%22+ 1991.
Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.
Berkes et al., Slow feature analysis yields a rich repertoire of complex cell properties. Journal of Vision (2005) vol. 5 (6).
Field et al., Information Processing in the Primate Retina: Circuitry and Coding. Annual Review of Neuroscience, 2007, 30(1), 1-30.
Fiete et al. Spike-Time-Dependent Plasticity and Heterosynaptic Competition Organize Networks to Produce Long Scale-Free Sequences of Neural Activity. Neuron 65, Feb. 25, 2010, pp. 563-576.
Foldiak, Learning invariance from transformation sequences. Neural Computation, 1991, 3(2), 194-200.
Gerstner et al., (1996) A neuronal learning rule for sub-millisecond temporal coding. Nature vol. 383 (6595) pp. 76-78.
Hopfield, (1995) Pattern recognition computation using action potential timing for stimulus representation. Nature 376: 33-36.
Izhikevich et al., (2009) Polychronous Wavefront Computations. International Journal of Bifurcation and Chaos, 19:1733-1739.
Izhikevich, (2004) Which Model to Use for Cortical Spiking Neurons? IEEE Transactions on Neural Networks, 15:1063-1070.
Izhikevich, (2007) Dynamical Systems in Neuroscience: The Geometry of Excitability and Bursting, The MIT Press, 2007.
Janowitz et al., Excitability changes that complement Hebbian learning. Network, Computation in Neural Systems, 2006, 17 (1), 31-41.
Knoblauch et al. Memory Capacities for Synaptic and Structural Plasticity, Neural Computation 2009, pp. 1-45.

(56) References Cited

OTHER PUBLICATIONS

Masquelier et al., Learning to recognize objects using waves of spikes and Spike Timing-Dependent Plasticity. Neural Networks (IJCNN), The 2010 International Joint Conference on DOI—10.1109/IJCNN.2010.5596934 (2010) pp. 1-8.

Meister, Multineuronal codes in retinal signaling. Proceedings of the National Academy of sciences. 1996, 93, 609-614.

Meister et al., The neural code of the retina, Neuron. 1999, 22, 435-450.

Oster et al., A Spike-Based Saccadic Recognition System. ISCAS 2007. IEEE International Symposium on Circuits and Systems, 2009, pp. 3083-3086.

Rekeczky et al., "Cellular Multiadaptive Analogic Architecture: A Computational Framework for UAV Applications." May 2004.

Revow et al., 1996, Using Generative Models for Handwritten Digit Recognition, IEEE Trans. on Pattern Analysis and Machine Intelligence, 18, No. 6, Jun. 1996.

Sanchez, Efficient Simulation Scheme for Spiking Neural Networks, Doctoral Thesis, Universita di Granada Mar. 28, 2008, pp. 1-104.

Schnitzer et al., Multineuronal Firing Patterns in the Signal from Eye to Brain. Neuron, 2003, 37, 499-511.

Serrano-Gotarredona et al, "On Real-Time: AER 2-D Convolutions Hardware for Neuromorphic Spike-based Cortical Processing", Jul. 2008.

Szatmary et al., (2010) Spike-Timing Theory of Working Memory. PLoS Computational Biology, 6(8): e1000879.

Thomas et al., 2004, Realistic Modeling of Simple and Complex Cell Tuning in the HMAX Model, and Implications for Invariant Object Recognition in Cortex, AI Memo 2004-017 Jul. 2004.

Thorpe, Ultra-Rapid Scene Categorization with a Wave of Spikes. In H.H. Bulthoff et al. (eds.), Biologically Motivated Computer Vision, Lecture Notes in Computer Science, 2002, 2525, pp. 1-15, Springer-Verlag, Berlin.

Thorpe et al., (2001). Spike-based strategies for rapid processing. Neural Networks 14, pp. 715-725.

Thorpe et al., (2004). SpikeNet: real-time visual processing with one spike per neuron. Neurocomputing, 58-60, pp. 857-864.

Van Rullen et al., Rate Coding versus temporal order coding: What the Retinal ganglion cells tell the visual cortex. Neural computation, 2001, 13, 1255-1283.

Van Rullen et al., (2003). Is perception discrete or continuous? Trends in Cognitive Sciences 7(5), pp. 207-213.

Van Rullen et al., (2005). Spike times make sense. Trends in Neurosciences 28(1).

Wallis et al., A model of invariant object recognition in the visual system. Progress in Neurobiology. 1997, 51, 167-194.

Wiskott et al., Slow feature analysis: Unsupervised learning of invariances. Neural Computation, 2002, 14, (4), 715-770.

Zarandy et al., "Bi-i: A Standalone Ultra High Speed Cellular Vision System", Jun. 2005.

\* cited by examiner

INVARIANT PULSE LATENCY CODING SYSTEMS AND METHODS

CROSS-REFERENCE TO RELATED APPLICATIONS

The present application is a Continuation application of U.S. patent application Ser. No. 12/869,583, filed Aug. 26, 2010, entitled "Invariant Pulse Latency Coding Systems and Methods Systems and Methods," which claims priority from U.S. Provisional Patent Application No. 61/318,191 filed Mar. 26, 2010, entitled "Systems and Methods For Invariant Pulse Latency Coding," which are expressly incorporated by reference herein.

BACKGROUND OF THE INVENTION

1. Field of the Invention

The present invention relates generally to a computer vision processing systems and more particularly to systems that encode visual signals into pulse-code output having information encoded into pulse timing.

2. Description of Related Art

It is known in the field of neuroscience that neurons generate action potentials, often called "spikes", "impulses", or "pulses" and transmit them to other neurons. Such pulses are discrete temporal events, and there could be many pulses per unit of time. Conventionally, bursts of a few spikes are considered to be pulses. It is not known how the brain processes information based on the timing of pulses or how visual features may be encoded using pulse-timing.

BRIEF SUMMARY OF THE INVENTION

Certain embodiments of the present invention comprise systems and methods for encoding visual signals into pulse-code output, where the information is transmitted by the relative timings of pulses. The advantage of the invention is that the signal-to-pulse encoding is insensitive with respect to the luminance and the contrast of the input signals.

The present invention relates generally to a computer vision system that encodes visual signals into pulse-code output, where information is encoded into the timing of pulses. It is motivated by neuroscience findings that timing of pulses is important for information transmission and processing. This invention is useful for implementation of the function of an artificial retina in information processing, robotic, or prosthetic devices.

In certain embodiments systems and methods are provided that address issues associated with slow adaptation of pulse-time code to low or high levels of luminance and contrast. Certain embodiments provide systems and methods of decoding the pulse-time code to extract features of the visual signal independently from their luminance and contrast.

Certain embodiments of the invention provide systems and methods for processing image signals. In certain embodiments, an image processing method comprises obtaining a generator signal based on an image signal. Relative latencies associated with two or more pulses in a pulsed signal are determined using a function of the generator signal. The function of the generator signal can comprise a logarithmic function. The function of the generator signal can be the absolute value of its argument. Information can be encoded in the pattern of relative latencies. The step of determining the relative latencies can include determining the latency of a next pulse using a scaling parameter that is calculated from a history of the image signal. The pulsed signal is typically received from a plurality of channels and the scaling parameter corresponds to at least one of the channels. The scaling parameter may be adaptively calculated such that the latency of the next pulse falls within one or more of a desired interval and an optimal interval.

The method may additionally comprise scaling the generator signal using a parameter that is calculated by applying a low-pass filter to a function representative of prior generator signals. The generator signal may be scaled using a parameter that is calculated as the average of a function representing generator signals observed over a certain time period. The image signal may be scaled using a scaling parameter based on a history of the image signal. The step of determining the relative latencies typically includes determining the latency of a next pulse using a parameter that is calculated from a low-pass filter of a function of the latencies of a plurality of preceding pulses.

In certain embodiments, the method comprises scaling the generator signal using a parameter that is calculated from a history of the image signal and/or a history of the generator signal. The parameter can be adaptively calculated such that the latency of the next pulse falls within one or more of a desired interval and an optimal interval.

In certain embodiments, the image signal may be scaled using one or more parameters, each parameter calculated using a history of one or more of a plurality of signal channels. The image signal may be scaled to adaptively maintain the image signal within a desired range. Two or more of the plurality of signal channels can have a common channel parameter, and the common channel parameter may be calculated using a history of the image signal. The channel parameters may include a parameter obtained by low-pass filtering a function derived from the image signal. In some embodiments, the step of scaling the image signal includes scaling the signal multiplicatively. Channel parameters may represent an average of a function derived from the input signal over a time window.

In certain embodiments, the method comprises the step of determining latencies associated with the two or more pulses using one or more parameters calculated from a history of the image signal. Latencies associated with the two or more pulses may be determined by time-shifting the pulses by magnitudes determined by one or more channel parameters. The pulsed signal may be received from a plurality of channels. Information may be extracted from the pulsed signal by decoding the pattern of relative latencies.

Portions of the methods may be performed by one or more processors embodied in a prosthetic device, an autonomous robot and/or distributed computer systems.

Certain embodiments of the invention provide an image processing system. A filter may provide a generator signal that is based on an input signal representative of an element of an image. A processor may be configured to receive the input signal and to determine relative latencies associated with two or more pulses in a pulsed output signal using a function of the generator signal. Latencies of pulses in the pulsed output signal are calculated using a scaling parameter that is calculated from a history of the image signal. Information may be encoded in a pattern of relative pulse latencies between a plurality of channels be used to communicate the pulsed output signal. The pattern of relative pulse latencies is typically insensitive to changes in image luminance and/or image contrast. Scaling parameters correspond to at least one of the channels. In certain embodiments, the function of the generator signal comprises a logarithmic function which may be applied to a rectified version of the generator signal. The logarithmic function can have an offset and a base, which may be optimized to obtain a range of the generator signal that matches the dynamic range of the latency values and the dynamic range of the image signal. The filter is spatially and/or temporally balanced and characterized by a substantially zero integral along all dimensions of the filter.

DETAILED DESCRIPTION OF THE INVENTION

Figure 1:
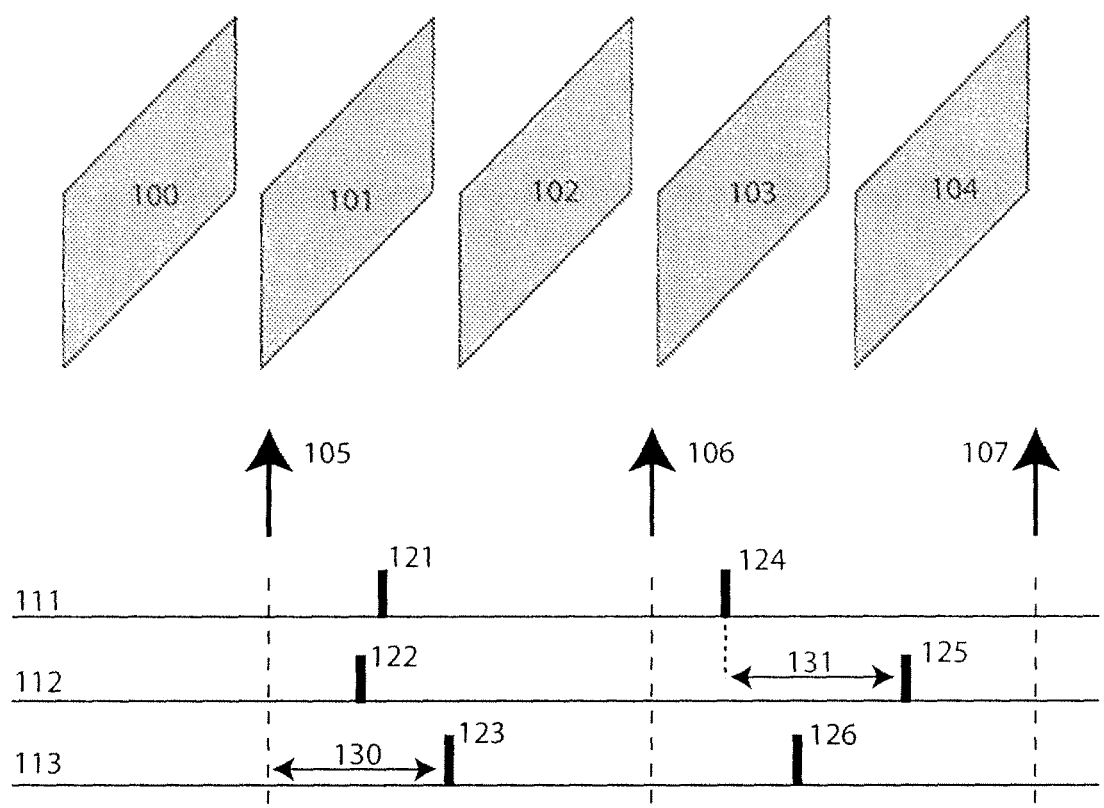
FIG. 1 illustrates the encoding of an input signal into latency of pulses along three communication channels.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Although certain aspects of the invention can best be understood in the context of conversion of visual input to pulse latency output in retina transmitted through multiple channels corresponding to retinal ganglion cells, disclosed systems and methods can be embodied in spatiotemporal filters implementing visual processing in general. For example, systems and methods according to certain aspects of the invention can be applied in a model of animal visual system as well as in the thalamus or cortex of an animal. Embodiments of the presently disclosed invention may be deployed in a hardware and/or software implementation of a computer-vision system, provided in one or more of a prosthetic device, robotic device and any other specialized visual system. For example, an image processing system according to certain aspects of the invention may comprise a processor embodied in an application specific integrated circuit ("ASIC") that can be adapted or configured for use in an embedded application such as a prosthetic device. Certain of the disclosed systems and methods may be used for processing of signals of other, often non-visual modalities. Certain of the disclosed systems and methods may be used for processing signals without spatial or temporal filtering.

For the purposes of this description, pulses are understood to refer to any of a single spike, a burst of spikes, an electronic pulse, a pulse in voltage, a pulse in electrical current, a software representation of a spike and/or burst of spikes and any other pulse in a pulsed transmission mechanism. For the purposes of this description, insensitivity of signal-to-pulse encoding with respect to luminance and/or contrast of an input signals may be understood as encoding that is invariant or substantially invariant to changes in luminance and/or contrast.

Certain embodiments of the invention can be used to encode visual features including features included in an observed scene, regardless of luminance and contrast. In some embodiments, information processing relies on different timing aspects of pulse timing in order to encode sensory input as a pulse-coded output, which can be used for further information transmission and processing.

For convenience and for the sake of illustration, we assume that the input signal is given as a function $I(x,t)$ of space x and time t. For example, the function may describe a movie with frame number t and a two-dimensional image parameterized by the spatial two-dimensional vector-variable x, as illustrated in FIG. 1 (frames 100-104). One goal is to convert the input signal to a pulse code over many channels that is invariant to contrasts.

Contrast-Invariant Encoding

Without loss of generality, the signal may be represented in the equivalent form:

$$I(x,t)=L(1-MS(x,t))$$

where the parameters L and M denote the luminance and the contrast, and the "feature" $S(x,t)$ has zero mean calculated over space and/or time.

Such an image can be analyzed by a plurality of channels, each having a linear spatiotemporal filter with kernel $F(x,s)$ satisfying the following "balance" condition:

$$\iint F(x,s)dxds=0 \qquad (1)$$

Each such filter can be applied to the input signal $l(x, t)$ to obtain a "generator signal" of the corresponding channel $$g(t)=\iint I(x,t-s)F(x,s)dxds$$

The generator signal can be used to calculate the timing of pulsed response relative to the time t, i.e., the latency of response transmitted over each channel:

$$\text{Lat}=C-\log_B |g(t)|_+$$

where $|g(t)|_+$ is the rectified value of $g(t)$, i.e., zero for negative $g(t)$ and equal to $g(t)$ when $g(t) \geq 0$. Other functions may be used in addition or in place of the piece-wise linear rectifier $\|_+$. For the purposes of this description, "rectifier" can mean a piece-wise linear or other function that is positive such that the log function is well defined. Parameter C is the offset and parameter B is the base of the logarithm. These parameters are typically selected to optimize the efficiency of the logarithmic conversion, so that the relevant range of the generator signal $g(t)$ is captured by the desired range of the latencies. For example, if the generator signal has a range of interest, $[g_{min}, g_{max}]$, and the desirable latency interval is $[l_{min}, l_{max}]$, then C and B can be found from the system of equations $l_{min}=C-\log_B g_{max}$, $l_{max}=C-\log_B g_{min}$. When $g(t)=0$ or $g(t)<0$, the latency of pulse may be assumed to be infinite. Such latency can be interpreted, e.g., as representative of non-generation of a pulse by a channel—corresponding to a pulse with infinite latency—or representative of a pulse generated with a relatively large latency. When $g(t)>g_{max}$ the channel may generate a pulse with very short latency. Negative latencies may be avoided by a cutoff at a value of $l_{min}$.

An example of signal to pulse latency encoding is illustrated in FIG. 1. In the example, the signal is depicted as a sequence of frames (frames 100-104). The conversion from signals to pulses occurs at time moments marked by arrows (105-107), which could occur every frame or at some frames, as shown in the drawing. Three output channels (111-113) generate pulses (121-126). Each such channel may have its own spatiotemporal filter, its own generator signal, and hence its own timing of pulses relative to the corresponding moment (vertical dashed lines next to arrows 105-107). For the purposes of this description, a latency of a pulse (e.g., 130 is the latency of the pulse 123) is distinguished from the difference between latencies (e.g., 131 is the difference between latencies of pulses 124 and 125), which is referred to herein as "relative latencies".

This approach offers the advantage that it results in contrast-invariant latency code; that is, individual latencies of pulses may depend on the contrast of the input signal, but relative latencies do not. Indeed, $$g(t) = \int\int I(x, t-s)F(x, s)dxds$$
$$= \int\int L(1+MS(x, t-s))F(x, s)dxds$$
$$= LM\int\int S(x, t-s)F(x, s)dxds$$

because of (Eq. 1). For the sake of simplicity of notation, it can be assumed that the generator signal is positive, and $|\ |_+$ can be omitted from the equation. The latency of each channel is $$Lat = C - \log_B g(t) = C - \log_B LM\int\int S(x, t-s)F(x, s)dxds$$
$$= C - \log_B LM - \log_B \int\int S(x, t-s)F(x, s)dxds$$

Thus latency of pulsed response on each channel is shifted by the constant $\log_B LM$ that depends on the luminance and the contrast of the input signal. However, latencies of all channels are shifted by the same constant, so the differences between latencies (relative latencies) are independent of the values L and M; in particular, they are contrast-invariant.

The condition (Eq. 1) may be referred to as the "balance condition," which can be satisfied when $$\int\int f(x,s)dx = 0 \text{(for all } s\text{;"spatial balance")}$$

$$\int\int f(x,s)ds = 0 \text{(for all } x\text{;"temporal balance")}$$

That is, the kernel, F, is zero along the spatial (dx) dimensions or temporal (ds) dimension, leading to "spatial" or "temporal" balance. It can also be zero even if neither of the two conditions above is satisfied, but the integral is evaluated along all dimensions. In practice, it is typically unnecessary to require that the integral be exactly zero and a small non-zero number may be permitted. In this case, the contrast-invariant pulse encoding will be approximate, i.e., it will contain a small error which is proportional to the absolute value of the integral in (Eq. 1). Since exact zeros may be difficult to achieve in practice, "approximate zero" condition may be considered to be a balance condition.

In certain embodiments, filters other than linear spatiotemporal filters may be used. The "balance condition" or "approximate zero" condition may be satisfied for motion sensitive filters, direction sensitive filters, certain nonlinear filters and other filters. A motion sensitive filter can comprise any suitable spatiotemporal filter that is responsive to the movement of a visual stimulus over the visual field in time. A direction sensitive filter can comprise a motion sensitive filter that is more responsive to motion of a stimulus over the visual field in some subset of all possible directions.

Latency Adaptation

It can be advantageous to adapt the sensitivity of the encoding mechanism such that latency within desired bounds adequately encodes inputs having luminance or contrasts that may vary over space and/or time by orders of magnitude. In certain embodiments, the generator signal may be mapped to latencies via the equation $$Lat = C - \log_B |g(t)/a(t)|_+$$

where the "adaptation" variable $a = a(t)$ evolves according to the differential equation $$da/dt = (|g(t)| - a)/\tau$$

(or its integral or discrete analogue) where $da/dt$ is the derivative with respect to time $t$, $|g(t)|$ is the absolute value of $g(t)$, and $\tau$ is the adaptation time constant. The adaptation variable $a(t)$ keeps track of the "average" value of $|g(t)|$, so that the latency indicates deviations from the average value. In another embodiment, the differential equation for the adaptation variable may be $$da/dt = (-1 + (e + |g(t)|)/a)/\tau$$

where $e > 0$ is some small number that is used to cap the unbounded growth of $a$ if $g(t) = 0$ for a long time. It will be appreciated that a difference between the two equations above is that the generator signal affects the time constant of adaptation in the latter case, but not in the former case.

In certain embodiments, the equation may also be $$da/dt = (f(g(t)) - a)/\tau$$

with some function $f$. A nonlinear (in a) version $$da/dt = f(g(t), a)$$

(or its integral or discrete analogue) is also possible. In this case, the variable $a(t)$ may reflect the history of $g(t)$ over a certain time window (possibly infinite, as in low-pass filtering).

This mechanism achieves the following desirable functions:

If $g(t)$ varies between different output values due to contrast value changes in its input, $a(t)$ will approach the average of such values of $g(t)$.

If $g(t)$ becomes very small, $a(t)$ will decrease proportionally so that the ratio $g(t)/a(t)$ approaches 1.

Similarly, if $g(t)$ becomes very large, $a(t)$ will grow and the ratio $g(t)/a(t)$ will approach 1 too.

Thus, the adaptation variable shifts the latency of pulses so that they always vary around certain "optimal" values, resulting in temporal contrast adaptation. In the example above, the optimal latency value, L, is $C - \log_B 1 = C$.

The adaptation parameter can also be a vector. For example, the filter $F(x, t)$ may be decomposed into a number of separate filters that are used to compute separate generator signals, which are combined to determine the main generator signal. In the visual system, for example, the filter $F(x, t)$ may have separable center and surround regions, and hence the adaptation parameter could have 2 values, one for the center and one for the surround. Both, the center and the surround, can adapt independently, and the adaptation vector would scale each corresponding generator signal, thereby affecting the main generator signal.

An alternative adaptation mechanism may adjust each latency by a subtractive parameter, i.e., Latency=Lat−$b(t)$ where $b(t)$ depends on the history of the latencies Lat, which are computed as above. For example, it can be a low-pass filter $db/dt=(P(\text{Lat})-b)/\tau$ (or its integral or discrete analogue), where P(Lat) is a function that restricts the values of Lat to a certain interval, e.g., by ignoring the values where Lat is infinity (which would correspond to g(t) being negative or zero) and replacing them with a finite number. Parameter $\tau_s$ is the time constant of the low-pass filter. One implementation of the low-pass filter functionality is the running average of P(Lat) over a certain time window. A nonlinear (in b) version of the equation above $db/dt=f(\text{Lat},b)$ is also possible.

The choice of the nonlinear function $f$ may be different for different variables (a or b) and for different applications. For example, the function may make the parameters adapt to the changing ranges of the magnitude of the input signal, its contrast, or its spatial and/or temporal statistics.

Input Signal Adaptation

In addition to the adaptation of the latencies conducted by the "adaptation variable" a(t) or b(t) and affecting directly the logarithmic conversion of the generator signal to latencies, it may be necessary and/or desirable to have an adaptation of the input signal itself. Such input signal adaptation may be referred to as "cone adaptation" as if the input signal were the signal coming from cone photoreceptors of retina, though the method would work for any other type of signal.

It is often desirable to take a raw signal I(x, t) and convert it to a rescaled signal J(x, t) where the values of J(x, t) at any spatial location, x, are deviations (positive or negative) from a certain "mid-point" value, which e.g. could be the mean of I(x, t) at the same location (and hence it would depend on x), or the mean over the entire signal, or the mean over a part of it. This way, the rescaled signal J(x, t) reports changes from the mean. However, if the mean of I(x, t) changes, e.g., due to changed luminance or contrast, it may be desirable that the rescaling and conversion to J(x, t) should also change adaptively, thereby modeling the cones of a retina.

In certain embodiments. It may be desired that the rescaled signal has approximately zero mean and deviations of the order of k from the mean for some constant k that might depend on the particular software and hardware restrictions. For example, in one example implementation, a value of k=127 is used when the pixel values are within the range [0, 255]. This can be achieved if $J(x,t)=I(x,t)p-k$ with an appropriate (possibly x-dependent) parameter p that adapts to the changing statistics of I(x, t) as to keep I·p≈k, which can be achieved through the following equation:

$dp/dt=(1-pI(x,t)/k)/\tau$

Here, $\tau_p$ is the input signal adaptation time constant. However, the input signal may be absent (i.e., I(x, t)=0) for a long period of time and, in this case, p will be growing unboundedly with the grown rate $1/\tau_p$. To cope with such condition, an upper bound may be set for the value of p. A slightly modified equation may be used:

$dp/dt=(1-p[e+I(x,t)]/k)/\tau$ where e>0 is a small parameter that would play the bounding role when I(x, t)=0 because p will asymptote at k/e in this case. In one example, for an input signal encoded as an RGB image with discrete values between 0 and 255, values of k=127 and e=1 may be used. In one embodiment, a 1 can be added to all pixels of the input signal and used the equation with no e.

In certain embodiments, the equation for signal adaptation may be $dp/dt=(k/[e+1(x,t)]-p)/\tau$ Notice that the difference between the two equations above is that the input signal affects the time constant of adaptation in the former case, but does not in the latter case. A nonlinear version of the input signal adaptation is also feasible $$dp/dt=f(I(x,t),p) \qquad (2)$$

with some function $f$ such that it promotes I·p≈k.

In another embodiment, the rescaled (adjusted) image may be given by $J(x,t)=I(x,t)-p$ where the offset p adapts to the input signal, e.g., via the low-pass filter differential equation $dp/dt=I(x,t)-p)/\tau$ or via a nonlinear function (Eq. 2).

Decoding

Figure 2:
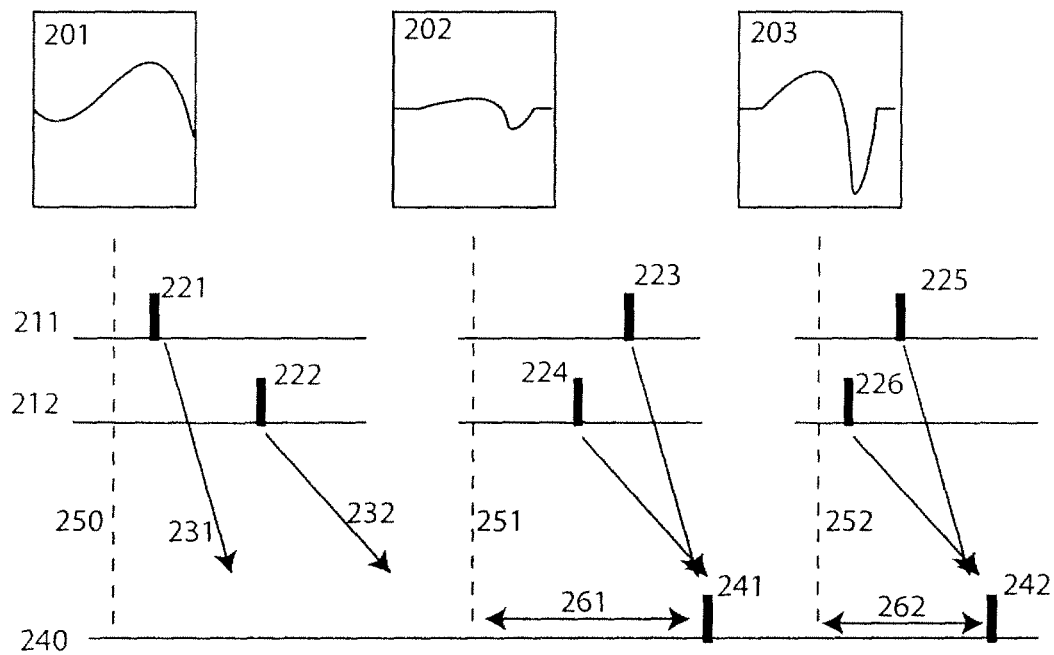
FIG. 2 illustrates the decoding mechanism of latency code employed in certain embodiments of the invention.

Certain embodiments have pulsed outputs whose relative latencies are invariant with respect to signal contrast is desirable for a decoder, whose job, e.g., may be to perform pattern recognition of the signal that is independent of attributes such as contrast. In one example, the decoder comprises a coincidence detector that signals coincident arrival of pulses. In another example, the decoder may receive input from the encoder with different transmission delays, as illustrated in FIG. 2. Such a decoder may generate a pulsed output when the relative latencies of pulses match the difference of transmission delays, and ignore other inputs. The response of such a decoder will typically be invariant to the contrast of the input signal. In another example, the decoder may be part of an organic nervous system, such as the nervous system of an animal which can receive input from a prosthetic device.

For example, suppose a signal (201) provided in one image frame results in two output pulses (221 and 222) generated by two channels (211 and 212) with certain latency from the time marked by the dashed line (250). The pulses arrive to the decoder (240) with certain transmission delays indicated by the arrows (231 and 232). Because the pulses arrive at different time, the decoder, being a coincident detector, will not register a coincidence. Now, another input signal (202) results in pulsed output with latencies (223 and 224) that have relative latencies (i.e., the difference of latencies) matching the difference of transmission delays. Such pulses arrive to the decoder at the same time (241) resulting in an output pulse. Increasing the contrast of the input signal (203) results in pulsed output (225 and 226) with shorter latencies, yet the same relative latencies (latency differences), which again matches the difference between transmission delays.

Thus, signals with different levels of contrast result in pulsed outputs with different latencies but with the same relative latencies and they can be readout by a decoder that receives these pulses along channels with different transmission delays that match the latency differences. Notice also that the decoder generates a pulsed output whose latency depends on the latency of the incoming pulses. Indeed, the latency 261 of the output pulse 241 is longer than the latency 262 of the output pulse 242.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide systems and methods for processing image signals. In certain embodiments, an image processing method comprises obtaining a generator signal based on the image signal. In certain embodiments, the method comprises determining relative latencies associated with two or more pulses in a pulsed signal using a function of the generator signal. In some of these embodiments, information is encoded in the pattern of relative latencies. In some of these embodiments, the step of determining the relative latencies includes determining the latency of a next pulse using a scaling parameter that is calculated from a history of the image signal. In some of these embodiments, the pulsed signal is received from a plurality of channels. In some of these embodiments, the scaling parameter corresponds to at least one of the channels. In some of these embodiments, the scaling parameter corresponds to at least two of the channels. In some of these embodiments, the scaling parameter is adaptively calculated such that the latency of the next pulse falls within one or more of a desired interval and an optimal interval. In some of these embodiments, the function of the generator signal is the absolute value of its argument.

In certain embodiments, the method comprises scaling the generator signal using a parameter that is calculated by applying a low-pass filter to a function representative of prior generator signals. In certain embodiments, the method comprises scaling the image signal using a scaling parameter based on a history of the image signal. In some of these embodiments, the step of determining the relative latencies includes determining the latency of a next pulse using a parameter that is calculated from a low-pass filter of a function of the latencies of a plurality of preceding pulses. In some of these embodiments, the function of the generator signal comprises a logarithmic function.

In certain embodiments, the method comprises scaling the generator signal using a parameter that is calculated from a history of the image signal. In certain embodiments, the method comprises scaling the generator signal using a parameter that is calculated from a history of the generator signal. In some of these embodiments, the parameter is adaptively calculated such that the latency of the next pulse falls within one or more of a desired interval and an optimal interval.

In some of these embodiments, the image signal comprises a plurality of signal channels, and further comprising scaling the image signal using one or more parameters, each parameter calculated using a history of one of the signal channels. In some of these embodiments, at least two of the plurality of signal channels have a common channel parameter, the common channel parameter being calculated using a history of the image signal. In some of these embodiments, the step of scaling the image signal includes adaptively maintaining the image signal within a desired range. In some of these embodiments, the one or more parameters includes a parameter obtained by low-pass filtering a function derived from the image signal. In some of these embodiments, the step of scaling the image signal includes scaling the signal multiplicatively. In some of these embodiments, one of the one or more parameters represents an average of a function derived from the input signal over a time window.

In some of these embodiments, the pattern of relative latencies is insensitive to image luminance. In certain embodiments, the method comprises the step of determining latencies associated with the two or more pulses using one or more parameters calculated from a history of the image signal. In certain embodiments, the method comprises the step of determining latencies associated with the two or more pulses by time-shifting the pulses by magnitudes determined by one or more channel parameters. In certain embodiments, the method comprises the step receiving the pulsed signal from a plurality of channels. In certain embodiments, the method comprises the step of extracting the information from the pulsed signal by decoding the pattern of relative latencies. In some of these embodiments, the one or more processors include a processor embodied in one or more of a prosthetic device and an autonomous robot. In certain embodiments, the method comprises the step of scaling the generator signal using a parameter that is calculated as the average of a function representing generator signals observed over a certain time period.

Certain embodiments of the invention provide an image processing system. Some of these embodiments comprise an input signal representative of an element of an image. Some of these embodiments comprise a filter that provides a generator signal based on the input signal. Some of these embodiments comprise a processor configured to receive the input signal and to determine relative latencies associated with two or more pulses in a pulsed output signal using a function of the generator signal. In some of these embodiments, latencies of pulses in the pulsed output signal are calculated using a scaling parameter that is calculated from a history of the image signal. Some of these embodiments comprise a plurality of channels that communicate the pulsed output signal. In some of these embodiments, the information is encoded in a pattern of relative pulse latencies between the channels. In some of these embodiments, the pattern of relative pulse latencies is insensitive to changes in at least one of image luminance and image contrast.

In some of these embodiments, the scaling parameter corresponds to at least one of the channels. In some of these embodiments, the function of the generator signal comprises a logarithmic function. In some of these embodiments, the logarithmic function is applied to a rectified version of the generator signal. In some of these embodiments, the logarithmic function has an offset and a base that are optimized to obtain a range of the generator signal that matches the dynamic range of the latency values and the dynamic range of the image signal. In some of these embodiments, the filter is spatially and temporally balanced and characterized by an integral along all dimensions of the filter that is substantially zero.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A method for use in a computerized data processing apparatus configured to process data comprising a sequence of images, the method comprising:
   for a given image of the sequence of images, determining a temporal latency value associated with one or both of a spatial change or a temporal change relative to one or more images preceding the given image within the sequence of images;

wherein:

individual ones of the sequence of images comprise a plurality of pixels having a pixel characteristic associated therewith;

one or both of the spatial change or the temporal change is determined based on a function of the pixel characteristic between the plurality of pixels of the given image and the plurality of pixels of the one or more images preceding the given image within the sequence of images;

the pixel characteristic is based on one or more of a pixel luminance value, a pixel chromaticity value, or a contrast parameter between two pixels;

the contrast parameter is determined based on one or both of (i) a difference between a luminance value of individual ones of the two pixels or (ii) a difference between chromaticity values of individual ones of the two pixels; and the temporal latency value is configured insensitive to a parameter determined based on an average luminance of individual ones of the two pixels.

2. A method for use in a computerized data processing apparatus configured to process data comprising a sequence of images, the method comprising:

for a given image of the sequence of images, determining a temporal latency value associated with one or both of a spatial change or a temporal change relative to one or more images preceding the given image within the sequence of images;

determining a parameter based on the given image and at least one preceding image; and scaling the given image based on the parameter;

wherein:

individual ones of the sequence of images comprise a plurality of pixels having a pixel characteristic associated therewith;

one or both of the spatial change or the temporal change is determined based on a function of the pixel characteristic between the plurality of pixels of the given image and the plurality of pixels of the one or more images preceding the given image within the sequence of images; and the parameter comprises one or both of a multiplicative parameter or a divisional parameter.

3. A method for use in a computerized data processing apparatus configured to process data comprising a sequence of images, the method comprising:

for a given image of the sequence of images, determining a temporal latency value associated with one or both of a spatial change or a temporal change relative to one or more images preceding the given image within the sequence of images;

determining a parameter based on first output and second output of the spatiotemporal filter corresponding to the given image and at least one image preceding the given image within the sequence of images; and scaling the first output based on the parameter;

wherein:

one or both of the spatial change or the temporal change is determined based on output of a spatiotemporal filter applied to individual ones of the sequence of images; and one or both of the spatial change or the temporal change is determined based on the scaled first output and the second output.

4. The method of claim 3, wherein:

the spatiotemporal filter comprises a first filter component associated with a first filter spatial characteristic and a second filter component associated with a second filter spatial characteristic;

the first filter spatial characteristic and second filter spatial characteristic configured to determine a filter weight within a spatial extent within the given image; and the parameter comprises a vector having a first adaptation component and a second adaptation component, the first adaptation component being based on the first filter spatial characteristic, the second adaptation component being based on the second filter spatial characteristic.

5. The method of claim 3, wherein the parameter is determined based on a process describable via a linear differential model configured based on a temporal derivative and an absolute value of the spatiotemporal filter output.

6. The method of claim 5, wherein:

the parameter is determined based on a statistical measure of the first output and the second output; and the statistical measure is selected from the group consisting of mean, median, and peak value.

7. The method of claim 5, wherein determining the temporal latency value associated with the given image is based on one or more temporal latency values associated with one or more images preceding the given image within the sequence of images.

8. The method of claim 5, wherein determining the temporal latency value associated with the given image is based on a low pass filter function of a plurality of temporal latency values associated with a portion the sequence of images occurring within a time window prior to the given image.

9. An image processing apparatus, comprising:

a filter logic module configured to determine a filtered signal based on a spatio-temporal filter of one or more images;

an encoder logic module configured to encode the filtered signal into a temporal latency of one or more pulses based on a logarithmic function of the filtered signal; and an adapter logic module configured to provide a scaled signal based on scaling a given image based on a parameter configured based on one or more images occurring prior to the given image;

wherein: the filter is applied to the scaled signal.

10. The apparatus of claim 9, wherein:

the adapter logic module is further configured to provide the scaled signal based on scaling a portion of the filtered signal associated with the given image based on one or more filtered signals associated with one or more images occurring prior to the given image; and the logarithmic function is applied to the scaled signal.

11. The apparatus of claim 10, wherein:

the one or more images are characterized by a luminance characteristic;

the logarithmic function is applied to a rectified version of the filtered signal; and the logarithmic function is characterized by an offset value and a base value, the offset value and the base value being based on a range of values of the temporal latency and a range of values of the luminance characteristic.

12. The apparatus of claim 9, wherein:
the spatio-temporal filter is characterized by two or more parameters;
individual ones of the one or more pulses are configured to be communicated via at least two channels, individual ones of the at least two channels having one of the two or more parameters associated therewith; and
the spatiotemporal filter comprises at least two spatio-temporal functions associated with the respective channel of the at least two channels.

13. The apparatus of claim 12, wherein the at least two spatio-temporal functions comprise a linear motion sensitive function configured based on a linear displacement of a portion of pixels within two or more consecutive images of the one or more images.

14. The apparatus of claim 12, wherein at least two spatio-temporal functions comprise a linear directive sensitive function configured based on a direction of displacement of a portion of pixels within two or more consecutive images of the one or more images.

15. The method of claim 2, wherein:
the spatial change determination is configured based on a first spatial characteristic and a second spatial characteristic;
the first spatial characteristic and second spatial characteristic configured to determine a weight associated with the plurality of pixels of the given image and the plurality of pixels of the one or more images preceding the given image;
the parameter comprises a vector having a first adaptation component and a second adaptation component, the first adaptation component being based on the first spatial characteristic, the second adaptation component being based on the second spatial characteristic.

16. The method of claim 15, wherein the parameter is determined based on a process describable via a linear differential model configured based on a temporal derivative and an absolute value of output of the function.

17. The method of claim 15, further comprising:
determining a parameter based on a first output and a second output of the function, the first output and the second output corresponding to the given image and at least one image preceding the given image within the sequence of images; and
scaling the first output based on the parameter;
wherein one or both of the spatial change or the temporal change is determined based on the scaled first output and the second output.

18. The method of claim 17, wherein:
the parameter is determined based on a statistical measure of the first output and the second output; and
the statistical measure is selected from the group consisting of mean, median, and peak value.

19. The method of claim 2, wherein determining the temporal latency value associated with the given image is based on one or more temporal latency values associated with one or more images preceding the given image within the sequence of images.

20. The method of claim 19, wherein determining the temporal latency value associated with the given image is based on a low pass filter function of a plurality of temporal latency values associated with a portion the sequence of images occurring within a time window prior to the given image.

* * * * *